United States Patent [19]

Sedlmayer

[11] Patent Number: 4,900,453

[45] Date of Patent: Feb. 13, 1990

[54] FILTER CENTRIFUGE CONTROL

[75] Inventor: Peter Sedlmayer, Munich, Fed. Rep. of Germany

[73] Assignee: Krause-Maffei Aktiengesellschaft, Munichen, Fed. Rep. of Germany

[21] Appl. No.: 230,276

[22] Filed: Aug. 5, 1988

[30] Foreign Application Priority Data

Aug. 7, 1987 [DE] Fed. Rep. of Germany ....... 3726227

[51] Int. Cl.[4] ............................................ B01D 45/12

[52] U.S. Cl. ...................................... 210/742; 73/291; 73/292; 210/86; 210/104; 210/149; 210/744; 210/746; 210/781; 494/6; 494/37

[58] Field of Search ............... 210/742, 744, 746, 781, 210/86, 96.1, 96.2, 104, 143, 149, 739, 787, 103, 512.1; 34/8, 58; 73/291, 292; 374/141, 142; 494/1, 10, 6, 37

[56] References Cited

U.S. PATENT DOCUMENTS

| | | | |
|---|---|---|---|
| 3,011,641 | 12/1961 | Huser | 210/104 |
| 3,019,902 | 2/1962 | McPhee et al. | 210/143 |
| 3,044,625 | 7/1962 | Smith et al. | 210/86 |
| 3,141,846 | 7/1964 | Laven, Jr. | 210/86 |
| 3,420,374 | 1/1969 | Umeda | 210/86 |
| 3,446,431 | 5/1969 | Marchal et al. | 210/86 |
| 3,559,808 | 2/1971 | O'Conor et al. | 210/86 |
| 3,752,389 | 8/1973 | Nilsson | 494/1 |
| 4,229,298 | 10/1980 | Bange | 210/746 |
| 4,361,037 | 11/1982 | Hauschild et al. | 73/292 |
| 4,382,382 | 5/1983 | Wang | 73/291 |
| 4,689,157 | 8/1987 | Tenthoff | 210/787 |

FOREIGN PATENT DOCUMENTS

| | | | |
|---|---|---|---|
| 2525232 | 12/1976 | Fed. Rep. of Germany . | |
| 302138 | 10/1971 | U.S.S.R. | 210/143 |

*Primary Examiner*—W. Gary Jones
*Assistant Examiner*—Joseph Drodge
*Attorney, Agent, or Firm*—Herbert Dubno

[57] ABSTRACT

A filter centrifuge has a feeler arm which contacts the free surface of the centrifuge contents to signify by the angular displacement of the arm, the thickness of the layer of contents in the filter drum. On the contact surface of the filter arm, at least one sensor is provided which is responsive to a characteristic of the material constructed by the arm for signalling the nature of the material.

19 Claims, 2 Drawing Sheets

FILTER CENTRIFUGE CONTROL

FIELD OF THE INVENTION

My present invention relates to filter centrifuge control and, more particularly, to a device or apparatus for controlling the operation of a filter centrifuge and for detecting the level of the contents of a filter centrifuge drum, i.e. the degree of filling thereof.

The invention also relates to a method of operating a filter centrifuge utilizing detection of the degree of filling of the filter centrifuge drum.

BACKGROUND OF THE INVENTION

From German Open Application DE-OS 25 25 232, it is known to provide a device for the control of a filter centrifuge in response to signals generated by a swingable arm which contacts the free surface of the centrifuge contents during rotation of the filter centrifuge drum. Level-measuring or filling-measuring signals may be outputted by the feeler arm.

Utilizing this technique, it is possible to ascertain the thickness of a layer on the centrifuge drum, i.e. the degree of filling of the centrifuge drum by the contents thereof.

For example, the information thus provided may be used to control the addition of the suspension to the filter drum, to terminate the filtering operation or for some other purpose.

A disadvantage of this device is that it can only provide information relating to the thickness of the layer of material on the filter drum and cannot indicate anything as to the characteristics of the centrifuge contents. It cannot, for example, indicate whether the free surface of the contents of the drum is that of the suspension which is to be filtered, washing liquid, or solids of the filter cake which is formed as the liquid phase is centrifugally expressed through the solids.

OBJECTS OF THE INVENTION

The principal object of this invention is to provide a method of and an apparatus for improving the operations of a filter centrifuge to obviate the aforedescribed drawback. Another object of the invention is to provide a device which will allow more efficient operation of a filter centrifuge in response at least in part to characteristics of the material forming the free surface of the centrifuge contents.

SUMMARY OF THE INVENTION

These objects and others which will become more readily apparent hereinafter are attained, in accordance with the invention, by providing as described, a feeler arm which is adapted to ride-up the free surface of the contents of the filter drum, the feeler arm having a contact surface engaging the free surface of the contents of the drum. According to the invention, the feeler arm is provided at or on this contact surface with at least one and possibly a plurality of sensors responsive to one or more physical characteristics of the surface of the contents of the centrifuge contacted by this arm.

Stated otherwise, the apparatus of the invention can comprise: a housing;

a filter drum rotatable in the housing to centrifuge a suspension in the drum;

a feeler arm pivotally mounted in the housing and having a contact surface adapted to contact the contents of the drum for signalling a degree of filling of the drum in terms of position of the arm; and sensor means at the contact surface for detecting at least one physical characteristic of the contents of the drum contacted by the feeler arm for signalling the nature of the contents. The method of the invention can comprise:

(a) introducing a suspension into a filter drum rotatable in a centrifuge housing and driving the filter drum about an axis of the drum to centrifuge the contents of the drum;

(b) monitoring the contents of the drum and the degree of filling thereof by contacting the contents of the drum with a contact surface of an arm swingably mounted on the housing and signalling a radial position of the contact surface; and (c) detecting the nature of the contents of the filter drum contacted by the arm by sensing at least one physical property of the contents of the drum at the contact surface.

The invention is based upon the fact that a suspension will have different physical characteristics than the filter cake, i.e. the solids of the suspension from which the liquid has been expressed, or from any washing liquid.

It has been found to be advantageous to measure the physical properties or characteristics by providing a thermoelement on the contact surface of the feeler arm and as the sensor. A thermoelement, such as a thermocouple, can give an immediate indication of temperature and provide, practically without any lag, an indication of the property of the free surface of the contents of the centrifugal drum. Since every material has a characteristic friction and correspondingly generates different degrees of friction heat from other materials, the frictional contact of the arm on the free surface of the centrifuge contacts will immediately generate a temperature which is characteristic of the centrifuging contents and the contacted surface.

Alternatively, but also advantageously, the sensor can detect electrical conductivity.

From the sensor or a plurality of sensors, therefore, I am able to ascertain continuously or periodically one or more physical parameters of the surface of the contents of the centrifuge while different for various liquids, suspensions and solids, thereby enabling a distinction between the aforementioned media and allowing me to compare the measured values with characteristic standard values or precalculated values for each medium, given the particular rotation speed and like parameters. For example, for a suspension the standard curve can relate measured temperature to solids concentrations.

In a present embodiment of the invention, at least one feeler arm can be provided with a measuring device which ascertains the radial position of the free surface of the contents of the drum so that the measuring device indicates the degree of filling.

This measuring device can be an angular displacement sensor which is coupled with the arm provided with the contact surface via a feeler shaft from which the arm extends perpendicularly and which is pivotally mounted in the housing of the centrifuge door.

By a combination of the sensor and its measuring circuitry and the angular displacement calculator, I am able to obtain data relating to the thickness of the layer on the centrifugal drum and its properties which enable me to automatically, through the use of a computer, for example, or with simpler feedback circuitry, to control the centrifuge filling and other parameters of centrifuge operation to optimize the solids/liquid separation in the filter centrifuge for any desired operating results or conditions.

It has been found to be important for optimum control of a filter centrifuge to be able to exactly determine the point in time at which the suspension liquid traversing the previously formed filter cake disappears from the free surface of the filter cake.

This "sink in point" ($F_E$) can be especially readily determined in accordance with the invention by the use of a thermoelement as the sensor because it corresponds to an especially clear temperature jump in the temperature detected by the sensor, since friction contact with a liquid-free solid surface yields substantially more frictional heat than contact of the feeler arm with the suspension. The time correlation of the sink in point ($F_E$) with a measured height ($h_k$) of the filter cake permits a computer responsive to both measured signals to alter the filling, filtration, washing and cake-peeling operations for suspensions having properties which change with time to obtain a desired residual moisture content in the filter cake and thus the cycling of the filter centrifuge between filling, washing, drying centrifugation and the like. In batch operation of the centrifuge at another point in time, the amount of material processed and the residual moisture of a filter cake can be ascertained.

BRIEF DESCRIPTION OF THE DRAWING

The above objects, features and advantages of my invention will become more readily apparent from the following description, reference being made to the accompanying drawing in which.

DESCRIPTION

Figure 1:
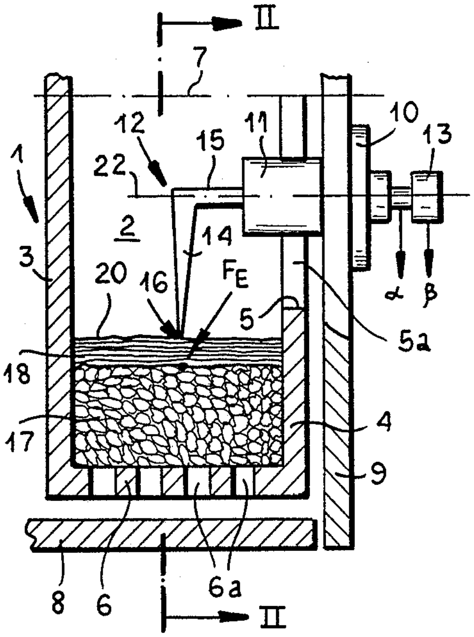
FIG. 1 is a diagrammatical illustration of a portion of a filter centrifuge seen in cross section.
Figure 2:
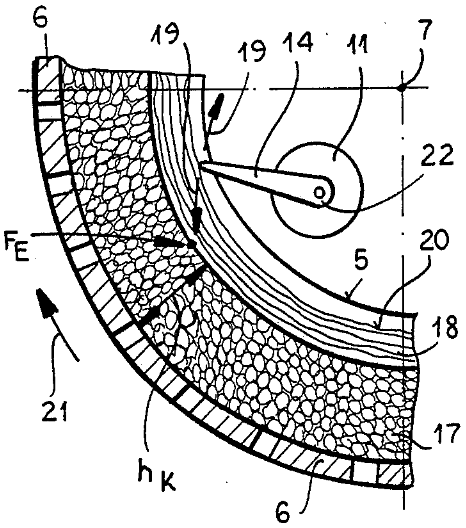
FIG. 2 is a sectional view taken along line II—II of FIG. 1.

FIGS. 1 and 2 show the principal elements of a filter centrifuge namely, a housing 9 and a filter drum 1 which is journaled in the housing for rotation about a centrifuge axis which has been indicated at 7. The closed drum wall 3, the perforated peripheral drum wall 6 and the inwardly extending annular flange 4 define a drum interior space 2 into which a suspension to be separated can be fed by means not shown and conventional in filter centrifuges. The housing can include means represented at 8 closing the space around the filter drum and collecting the liquid phase which is expressed by centrifugal force through the openings 6*a* in the peripheral wall 6 of the filter drum.

In the housing member 9, a flange 10 mounts a measuring device 11 which comprises a feeler arm 12 extending radially from a shaft 15 which extends parallel to the axis 7. The feeler arm 12 extends into the space 2 and can have a contact surface 16 which can lie against the inner free surface 20 of the contents of the filter drum which, of course, must lie outwardly of the inner edge 5 of the flange defining the opening 5*a* through which the suspension is introduced.

The feeler arm 12 is connected to an angular displacement transmitter or signalling device 13, for example, a rotary potentiometer, located outside the centrifuge housing 2. The feeler arm 12 comprises as noted, the feeler 14 itself and the feeler shaft 15 from which member 14 extends perpendicularly, member 14 having at its free end the contact surface 16 which can be provided with one or more sensors respective to physical characteristics of the centrifuge contents and generating measurement signals $\alpha$ represent characteristics of the composition contacted by the sensor.

The angular displacement transmitter 13 generates a measurement signal $\beta$ which represents the position of the contact surface 16, the angular displacement of arm 14 and hence the thickness of the layer forming the centrifuge contents.

The centrifuge contents comprise a solid layer of filter cake 17 whose layer thickness or radial cake height has been designated $h_k$ heretofore and is visible in FIG. 2. Until all of the liquid phase sinks into this layer, and if a wash liquid is applied, a liquid layer 18 can lie upon the inner surface of the filter cake and can consist of the washing liquid or the filtrate liquid or the suspension.

The feeler arm 12 is swingable in the direction of arrow 19 (FIG. 2) to effect a measurement of the degree of filling of the centrifuge; the feeler arm 12 is pressed with slight force upon the filling surface 20, i.e. the free surface of the contents of the centrifuge drum, so that the contact surface 16 will remain in contact with this free surface 20.

Since the drum is rotated in the direction of arrow 21, the position assumed by the feeler 14 is a position generated by drag force applied thereagainst. The axis 22 of the feeler shaft 15 is parallel to the drum or centrifuge axis 7.

Figure 3:
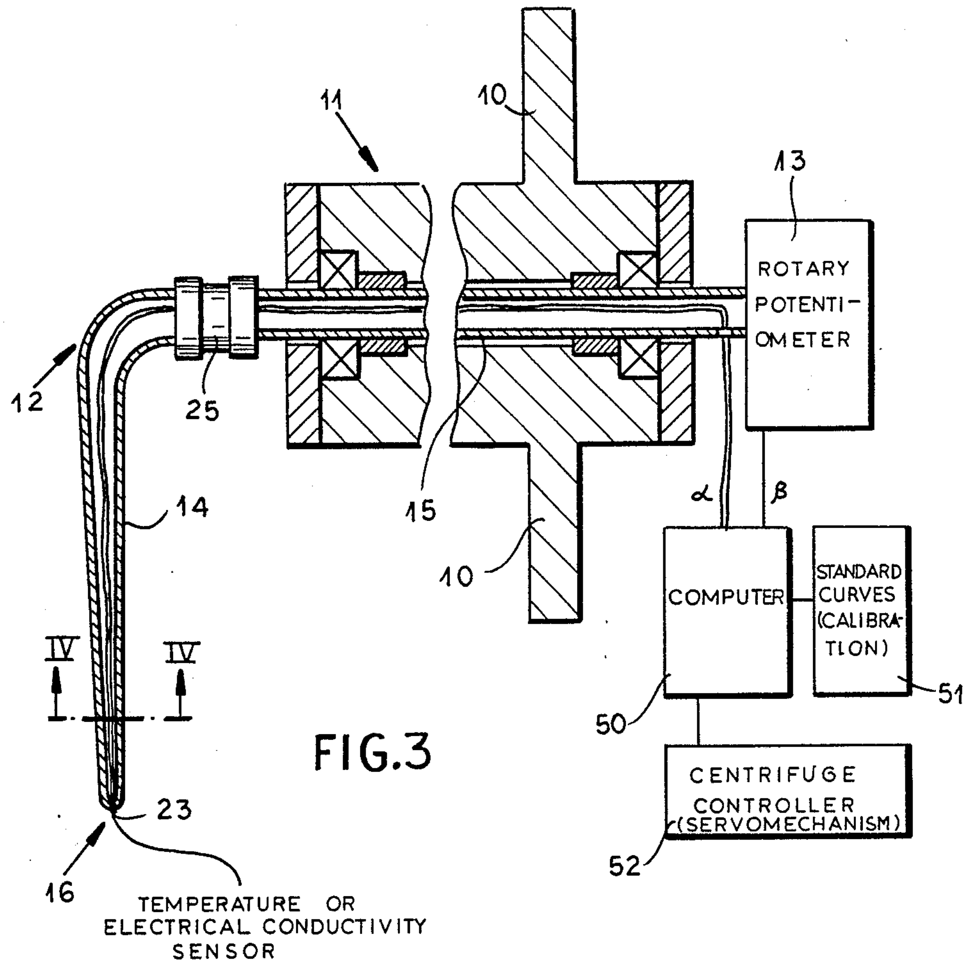
FIG. 3 is a detailed view of the feeler arm of FIG. 1 drawn to a larger scale.

The cross-sectional detail of the measuring device 11 shown in FIG. 3, indicates the the feeler 14 has at its contact surface 16 a sensor in the form of the thermoelement or thermocouple 23.

Figure 4:
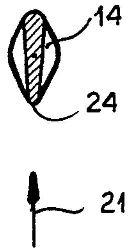
FIG. 4 is a cross-sectional view showing the centrifuge of a feeler arm and taken generally along the line IV—IV of FIG. 3.

As shown in FIG. 4, the sensor 14 in cross section in the region of its contact surface has the profile of a knife blade with the leading edge, i.e. the narrow edge 24 of the feeler 14 turned opposite the direction of rotation of the sieve drum. This arrangement and shape of the region of the feeler 14 has the advantage that the actual contact with the free surface 20 takes place along a limited but well-defined area and is free from spattering so that the contact is reliable and the measurements obtained are precise.

The feeler 14 can be connected with the feeler shaft 15 by a plug and socket connection 25 which serves both as a mechanical and electrical coupling with these points. The feeler shaft 15 is pivotal about its axis and is hollow to conduct the electrical conductors running from the thermocouple 23 to the outside of the feeder shaft to the electronic circuitry riding the thermocouple. Measuring signal lines from the thermocouple 23 supply the measuring signal $\alpha$ and the lines from the angular displacement generator supplying signal $\beta$ are applied to a computer 50 which is supplied with an input 51 supplying standard curves or calibration inputs to the computer for optimization of the centrifugation process. Naturally, element 51 may be a memory in which the data has previously been stored. Utilizing the inputs $\alpha$ and $\beta$ and comparing this data with the stored data at 51, the centrifuge controller 52, for instance, a servomechanism can be operated to vary the filling rate, control washing of the filter cake, control centrifuge speed or the like.

Figure 5:
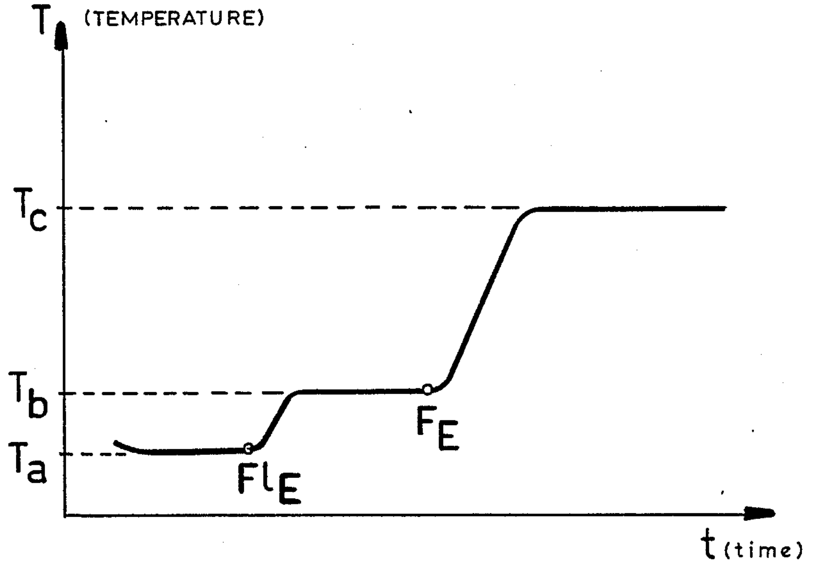
FIG. 5 is a temperature vs. time characteristic or standard diagram illustrating the sink in point $F_E$.

In FIG. 5, I have provided a diagram in which the temperature detected by the thermocouple 23 is plotted along the ordinate against time as plotted along the abscissa. The diagram shows that the temperature vs. time curve at different angular positions of the feeler arm 12. At $T_a$, the temperature as detected by the sensor when the feeler arm is out of contact with the contents of the drum has been given. The temperature $T_b$ represents the temperature upon contact of the feeler arm with the surface 20 of the liquid layer 18.

The temperature $T_c$ is the temperature which is sensed by the arm as it contacts the filter cake when the liquid from liquid layer 18 sinks fully into the filter cake.

The points $F1_E$ and $F_E$ represent the exact points in time when the temperature of the sensor comes into contact with the liquid surface and with the filter cake surface, thereby giving the precise cross points at which the angular position of the arm represents the respective thickness of the filling including the liquid layer and the filter cake itself.

Below I have described the operation of a filter cake in a batch manner according to the invention by contrast with the state of the art approach.

In a conventional filter operation, the following steps are practiced:

Filling the sieve drum with the suspension,

Washing with a washing liquid,

Drying centrifugation of the filter cake, and Peeling away the filter cake by means of a scraping or peeling arrangement (not shown).

Upon filling the sieve drum with the suspension, a filter cake or cake of solids is formed through which the suspension liquid is filtered so that the point in time $F_E$ at which the liquid level disappears from the surface of the filter cake is exactly determined.

In the past, this point in time could not be determined with precision since it required visual observation or like techniques which were readily obscured by mist or the like.

As a result, the operational phases of the filter cake could not be controlled accurately. This lead to serious disadvantages.

When the centrifugation time was too long, apart from the fact that the apparatus was operated unnecessarily, there was always the danger that air would penetrate into the filter cake and be detrimental to the washing effect. When the centrifugation time was too short, there was the danger that the washing medium would meet residual filtrate or mother liquor which also could result in poor washing effect.

With the present invention, it is possible to estimate a precise point in time, namely, the sinking-in-point $F_E$ in a variable length cycle so that the next stage can be automatically effected without either of the two drawbacks mentioned earlier.

By estimating respective sinking-in points $F_E$ in sequence, batches can be processed one after another fully and without detriment to the washing stage until the filter cake thickness reaches the edge 5 of the flange 4 while always ensuring sufficient room for treatment of the filter cake with the washing medium in one or more cycles.

Of course, the invention also allows both the filtration velocity and the volume of the solid cake to be measured and utilizing the computer, it is possible to coordinate the true flow of suspension liquid, washing medium and residual solids as well as solids removed by the scraping device. In all cases, calibration or standards can be estimated to provide a desired residual moisture content. Of course, residual moisture may also be measured utilizing an appropriate sensor.

After the sinking-in point $F_E$ is reached following the last washing stage, the drying centrifugation is commenced during which any washing medium remaining in the filter cake is centrifugally removed. This phase can be carried out over a predetermined time period without concern for fluctuations in the filtering and washing times or phases. For precise determination of the filter time, an appropriate characteristic can be utilized as the standard time, the computer from the last sinking-in time $F_E$ to yield a product with the desired residual moisture content. It is simple to determine empirically such a characteristic by measurements of the drying centrifugation times required for particular charges of material. It is possible in this operation to establish a so called base layer which is permitted to remain on the sieve surface of the drum and to adjust from charge to charge the drying time as this base layer becomes increasingly more dense and less permeable.

Apart from the ability to control the computer utilizing characteristic curves and control parameters generated from such empirical or standard curves, the invention permits variable or self-adjusting cycle times allowing optimal operation of the centrifuge for any desired result, for example, minimal residual moisture content, maximum filtration speed, reduced drying centrifugation time or the like.

I claim:

1. A filter centrifuge, comprising:

a housing;

a filter drum rotatable in said housing to centrifuge a suspension in said drum;

a feeler arm pivotally mounted in said housing and having means defining a contact surface for contact with the contents of said drum and having means for signalling a degree of filling of said drum in terms of radial position of said arm; and sensor means at said contact surface for detecting at least one physical characteristic of the contents of said drum contacted by said feeler arm for signalling the nature of said contents, said sensor means including a temperature sensor.

2. The filter centrifuge defined in claim 1, wherein said temperature sensor is a thermoelement.

3. The filter centrifuge defined in claim 1, further comprising a measuring device operatively connected to said feeler arm and responsive to a radial position of said contact surface on the contents of said drum for signalling said degree of filling of said drum in terms of position of said arm.

4. The filter centrifuge defined in claim 3 wherein said measuring device is an angular-displacement indicator.

5. The filter centrifuge defined in claim 4 wherein said angular-displacement indicator is a rotary potentiometer.

6. The filter centrifuge defined in claim 1 wherein said drum is rotatable about a drum axis, said arm extends generally perpendicular to said axis, said filter centrifuge further comprising a sensor shaft rotatable on said housing, parallel to said axis, and carrying said feeler arm.

7. The filter centrifuge defined in claim 6, further comprising a plug-and-socket coupling releasably connecting said feeler arm with said shaft.

8. The filter centrifuge defined i claim 6 wherein said feeler shaft is operatively connected with a servomechanism.

9. The filter centrifuge defined in claim 1, further comprising means connected with said arm for controlling operation of the centrifuge.

10. A filter centrifuge, comprising:

a housing a filter drum rotatable in said housing to centrifuge a suspension in said drum;

a feeler arm pivotally mounted in said housing and having means defining a contact surface for contact with the contents of said drum and having means for signalling a degree of filling of said drum in terms of radial position of said arm; and sensor means at said contact surface for detecting at least one physical characteristic of the contents of said drum contacted by said feeler arm for signalling the nature of said contents, said sensor means including an electrical-conductivity sensor.

11. The filter centrifuge defined in claim 10, further comprising a measuring device operatively connected to said feeler arm and responsive to a radial position of said contact surface on the contents of said drum for signalling said degree of filling of said drum in terms of position of said arm.

12. The filter centrifuge defined in claim 11 wherein said measuring device is an angular-displacement indicator.

13. The filter centrifuge defined in claim 12 wherein said angular-displacement indicator is a rotary potentiometer.

14. The filter centrifuge defined in claim 10 wherein said drum is rotatable about a drum axis, said arm extends generally perpendicular to said axis, said filter centrifuge further comprising a sensor shaft rotatable on said housing, parallel to said axis, and carrying said feeler arm.

15. The filter centrifuge defined in claim 14, further comprising a plug-and-socket coupling releasably connecting said feeler arm with said shaft.

16. The filter centrifuge defined in claim 10, further comprising means connected with said arm for controlling operation of the centrifuge.

17. A filter centrifuge, comprising:

a housing a filter drum rotatable in said housing to centrifuge a suspension in said drum;

a feeler arm pivotally mounted in said housing and having means defining a contact surface for contact with the contents of said drum and having means for signalling a degree of filling of said drum in terms of position of said arm; and sensor means at said contact surface for detecting at least one physical characteristic of the contents of said drum contacted by said feeler arm for signalling the nature of said contents, said arm in the region of said contact surface having a knife-edge shape with a narrow front edge turned in a direction opposite the direction of movement of the drum.

18. A method of operating a filter centrifuge, comprising the steps of:

(a) introducing a suspension into a filter drum, rotatable in a centrifuge housing and driving the filter drum about an axis of the drum to centrifuge the contents of the drum;

(b) monitoring the contents of said drum and the degree of filling thereof by contacting the contents of said drum with a contact surface of an arm swingably mounted on said housing and signalling a radial position of said contact surface; and (c) detecting the nature of the contents of said filter drum contacted by said arm by sensing at least one physical property of the contents of said drum at said contact surface, the physical properties of the contents of the drum which are sensed including the temperature of the contents of the drum.

19. A method of operating a filter centrifuge, comprising the steps of:

(a) introducing a suspension into a filter drum, rotatable in a centrifuge housing, and driving the filter drum about an axis of the drum to centrifuge the contents of the drum;

(b) monitoring the contents of said drum and the degree of filling thereof by contacting the contents of said drum with a contact surface of an arm swingably mounted in said housing and signalling a radial position of said contact surface; and (c) detecting the nature of the contents of said filter drum contacted by said arm by sensing at least one physical property of the contents of said drum at said contact surface, the physical properties of the contents of the drum which are sensed including the electrical conductivity of the contents of the drum.

* * * * *